United States Patent [19]

Pacey et al.

[11] 4,274,707

[45] Jun. 23, 1981

[54] APPARATUS FOR FUSION SPLICING OF OPTICAL FIBERS

[75] Inventors: Grant K. Pacey, Nepean, Canada; Jaroslav M. Hvezda, Playa Del Rey, Calif.

[73] Assignee: Northern Telecom Limited, Montreal, Canada

[21] Appl. No.: 48,669

[22] Filed: Jun. 14, 1979

[51] Int. Cl.³ ............................. G02B 5/14; B23K 9/00
[52] U.S. Cl. ................................. 350/96.20; 65/4 B; 219/121 PX
[58] Field of Search ............... 350/96.15, 96.20, 96.21, 350/96.22; 65/4 R, 4 A, 4 B; 219/121 PX; 156/158

[56] References Cited

U.S. PATENT DOCUMENTS

| 3,810,802 | 5/1974 | Buhite et al. ........................... 156/158 |
| 3,960,531 | 6/1976 | Kohanzadeh et al. ................. 65/4 B |
| 4,049,414 | 9/1977 | Smith ..................................... 65/4 B |
| 4,118,618 | 10/1978 | Gauthier et al. ................... 219/121 P |
| 4,141,776 | 2/1979 | Ellwood et al. ................... 156/158 X |

FOREIGN PATENT DOCUMENTS

| 2611658 | 9/1977 | Fed. Rep. of Germany ........ 350/96.21 |
| 2713711 | 10/1978 | Fed. Rep. of Germany ............. 65/4 B |

OTHER PUBLICATIONS

Fujita et al., "Optical Fiber Splicing Technique with a $CO_2$ Laser", *Appl. Optics*, vol. 15, No. 2, Feb. 1976, pp. 320-321.
Kohanzadeh, "Hot Splices of Optical Waveguide Fibers", *Applied Optics*, vol. 15, No. 3, Mar. 1976, pp. 793-795.
Bisbee, "Splicing Silica Fibers with an Electric Arc", *Applied Optics*, vol. 15, No. 3, Mar. 1976, pp. 796-798.
Hatakeyama et al., "Fusion Splices for Optical Fibers by . . . ", *Applied Optics*, vol. 17, No. 12, Jun. 1978, pp. 1959-1964.

*Primary Examiner*—John K. Corbin
*Assistant Examiner*—John D. Lee

[57] ABSTRACT

A fusion apparatus for fusing a pair of optical fibers end-to-end by an electrical arc has a fiber gripping head on a support housing in which the various electrical and electronic circuits and control devices are housed. The gripping head has two fiber holding members, each member having a first portion for holding a coated portion of a fiber and a second spring loaded portion for bearing on a stripped portion of a fiber end. The second portion is deflectable relative to the first portion. Two electrodes, in opposition, are mounted one on each side of an axis through the fiber ends. A prefusion arc can be provided for initial rounding of the fiber ends. The prefusion arc and fusion arc times can be preset. Transfer members can be mounted on the housing for moving a fused pair of fibers to a heating position where a heat shrink sleeve, previously slid on one of the fiber ends, can be positioned over the splice and heat shrunk on to the splice.

4 Claims, 24 Drawing Figures

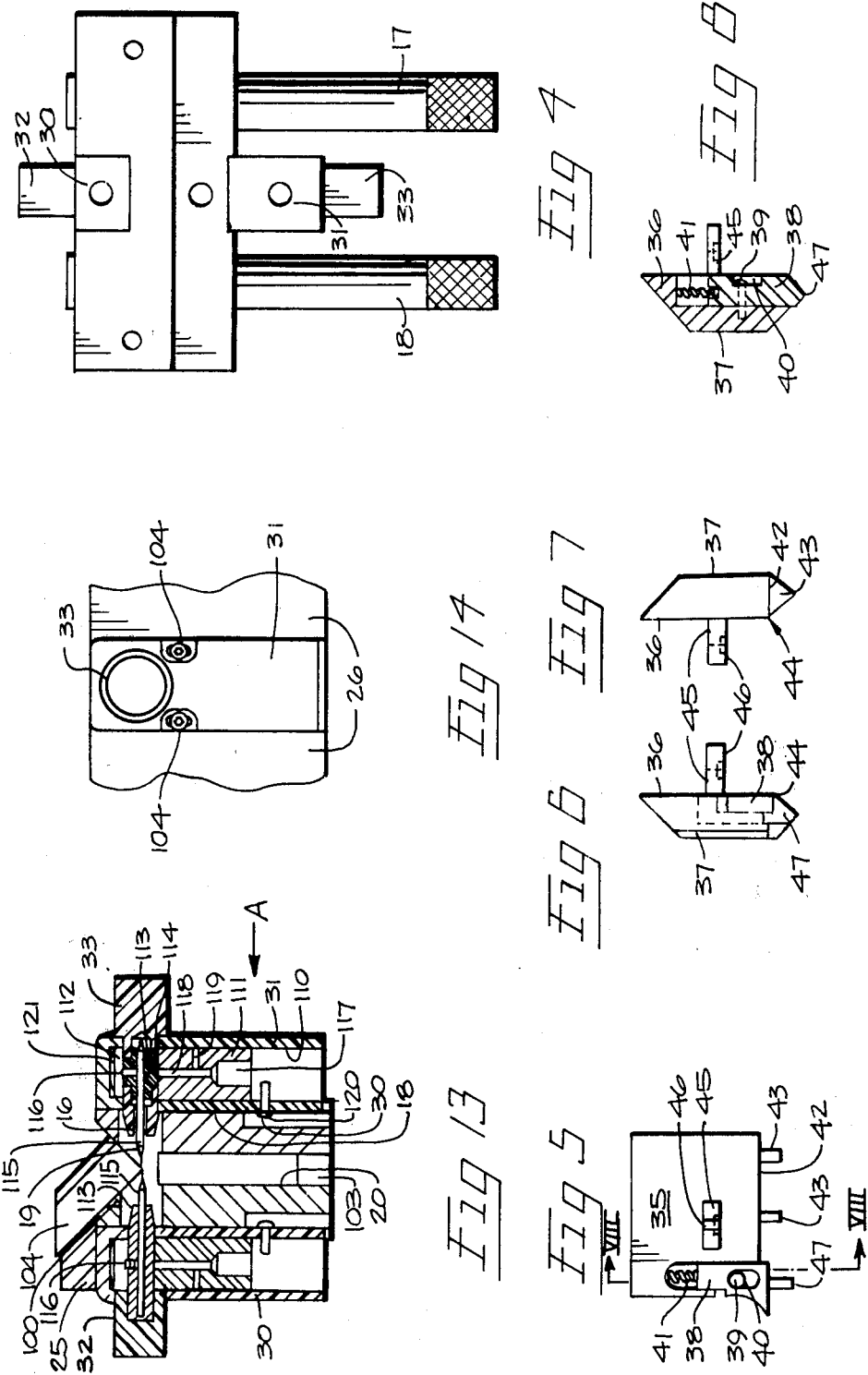

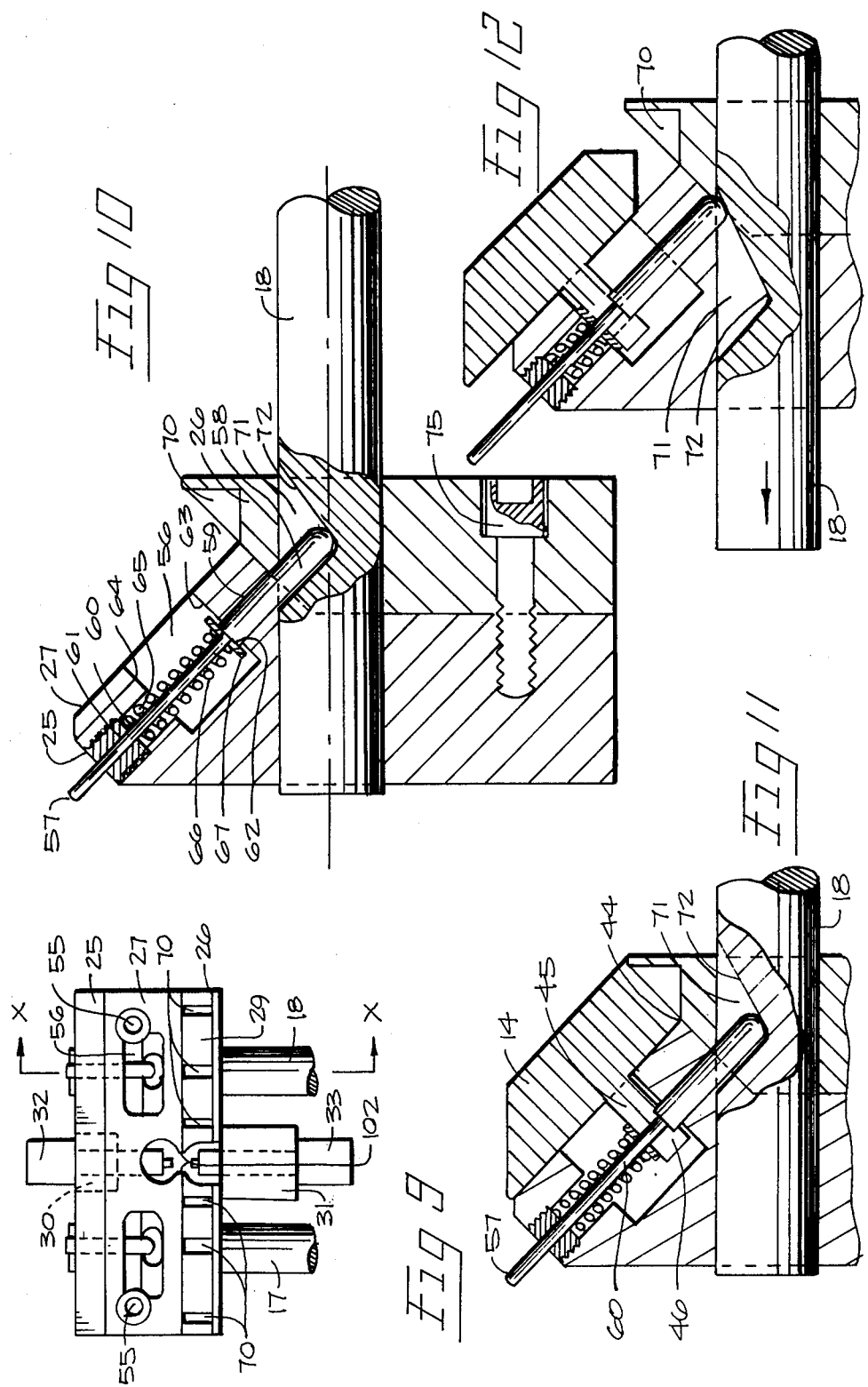

APPARATUS FOR FUSION SPLICING OF OPTICAL FIBERS

This invention relates to apparatus for fusion splicing of optical fibers and is applicable to such splicing "in the field". That is the apparatus is such as will provide a high degree of initial alignment in a simple and effective manner and is operable under normal installation conditions, for example in manholes and the like, by ordinary installation and repair personnel.

While fusion splicing of optical fibers is known, generally there is required some manipulation of the opposed fiber end prior to fusion. While such manipulation can be readily carried out in a laboratory or other similarly sheltered conditions it is not so easy under actual installation and repair conditions. Further, in normal day-to-day usage it is desirable to be able to make splices quickly, for commercial reasons.

The present invention provides an apparatus having a fiber griping head and electrodes across which an arc is created, mounted on a support housing which houses the various electronic and electric circuits and control devices for the fusion. The gripping head includes two holding members to hold two fibers in the base of a Vee groove. Each holding member includes a portion for lightly holding and guiding a coated fiber and a separate, light spring loaded member for bearing on a stripped portion of a fiber, that is on a portion of the fiber from which the coating has been removed. Generally a fiber comprises a light transmitting core, for example of fused silica, with or without a cladding layer, and coated with a plastic coating material for protection and ease of handling. In the present apparatus the coating is stripped from the end of a fiber before insertion in the apparatus.

In one form of the invention the holding members are actuated by simple push-pull members and can readily be removed for cleaning. In an alternative arrangement, spring load fingers are lifted and lowered to hold the fibers. Electrodes for the production of an arc therebetween are positioned on either side of the position where the two fiber ends abut. In some circumstances it has been found useful that pre-rounding of the fiber ends occur by creating the arc with the fiber ends spaced a small distance apart. The fibers are then pushed together cold and then fused with the arc. One gripping head, or both, can be provided with means for pushing the fiber ends into contact prior to, or during, fusion. Such end movement can be provided whether or not initial rounding of the fiber ends is provided.

After fusion it is desirable to cover the splice. It is a feature of the present invention that a sleeve of heat-shrink material can be positioned over one of the fibers prior to fusion and then the sleeve slid axially, until over the splice. The spliced fibers are then positioned in a heating member to shrink the tube. Conveniently two arms pivotally mounted on the support housing have gripping devices at their ends which pick up the fused fibers and swing them over from the gripping heads to the heating member, avoiding manual handling.

The invention will be readily understood by the following description of embodiments of the invention, in conjunction with the accompanying drawings, in which:

FIG. 4 is a bottom view of the gripping head;

FIGS. 5, 6 and 7 are back view and opposite end views respectively of one of the sliding members in the gripping head;

FIG. 8 is a cross-section on the line VIII—VIII of FIG. 5;

FIG. 9 is a top plan view of the gripping head, similar to that of FIG. 2, but with the slidable members removed;

FIG. 10 is a cross-section on the line X—X of FIG. 9, to an enlarged scale;

FIG. 11 is a cross-section, similar to that of FIG. 10, but with the slidable member in position and in a fiber holding position;

FIG. 12 is a cross-section similar to that of FIG. 11, but with the slidable member actuated to a non-holding position;

FIG. 13 is a cross-section on the line XIII—XIII of FIG. 2 illustrating the electrical connections to the electrodes;

FIG. 14 is a view in the direction of arrow A in FIG. 13;

Figure 1:
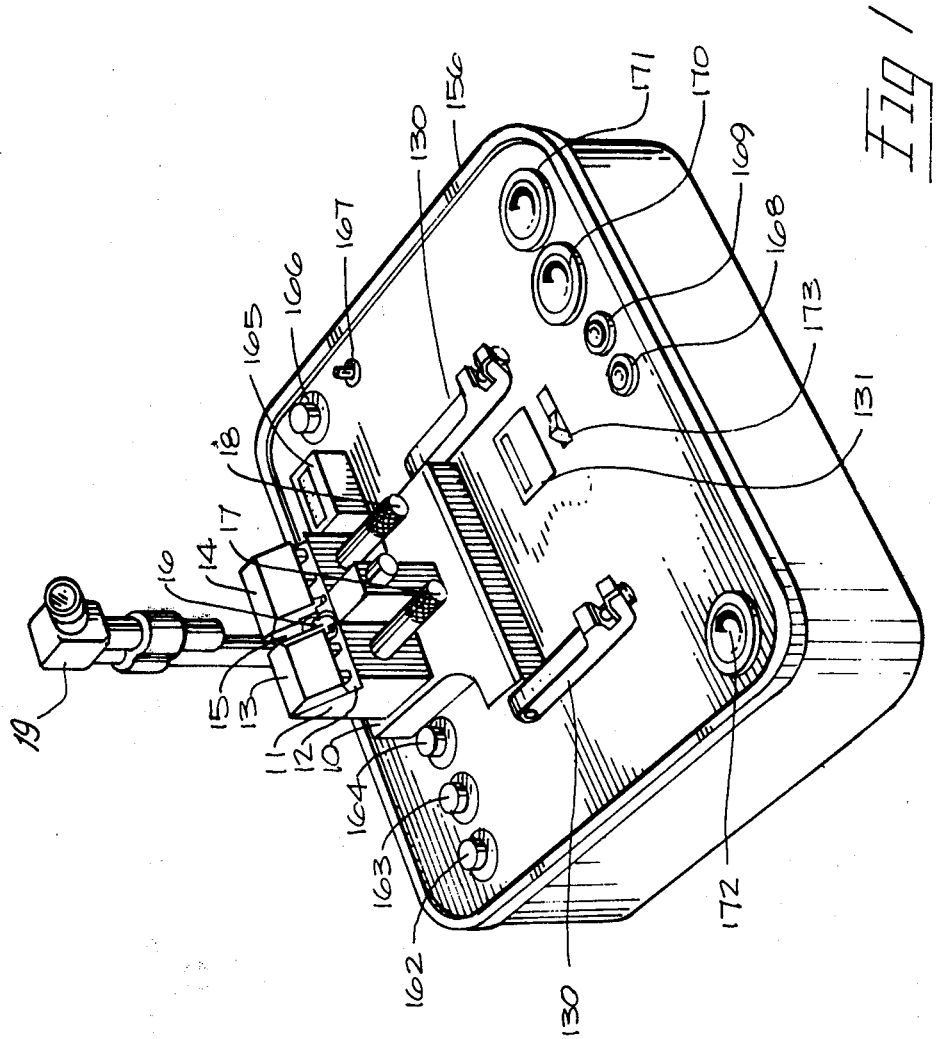
FIG. 1 is a perspective view of one form of the complete apparatus.

As illustrated in FIG. 1, a support member 10 has mounted on a top surface a gripping head 11. The gripping head is of a form to provide a Vee groove, indicated generally at 12, extending across the head, and has two holding members 13 and 14 slidably mounted on one surface of the Vee groove. The holding members are spaced apart along the gripping head and positioned in the gap 15 between the members 13 and 14 are two opposed electrodes 16, only one of which is seen in FIG. 1. The movable holding members 13 and 14 are moved up and down on the Vee groove surface by two push-pull rods 17 and 18. To insert fibers, the rods 17 and 18 are pushed in, the members 13 and 14 slide up and the two fibers positioned in the bottom of the Vee groove. Generally, the outer, plastic, coating is removed for a short distance at the end of each fiber. The Vee groove has two levels, the outer levels, that is at each outer end of the gripping head, being slightly lower than the level at each side of the gap 15. The uncoated ends of the fibers rest on the higher levels adjacent the gap while coated portions of the fibers rest in the lower levels.

After positioning the ends of the fibers adjacent to each other, which is facilitated by the microscope 19, the ends can be fused together by producing an arc between the electrodes 16. As previously stated, the fibers can first be positioned with their ends slightly apart so that the initial arc rounds the ends. The fibers are then pushed together and the arc fuses the ends. Alternatively, the arc can be formed after the fiber ends are butted together, for fusing. Some end load can be applied to the fibers, generally to one fiber, to push the fibers together during fusion. This helps to reduce necking and reduces insertion losses.

Figure 2:
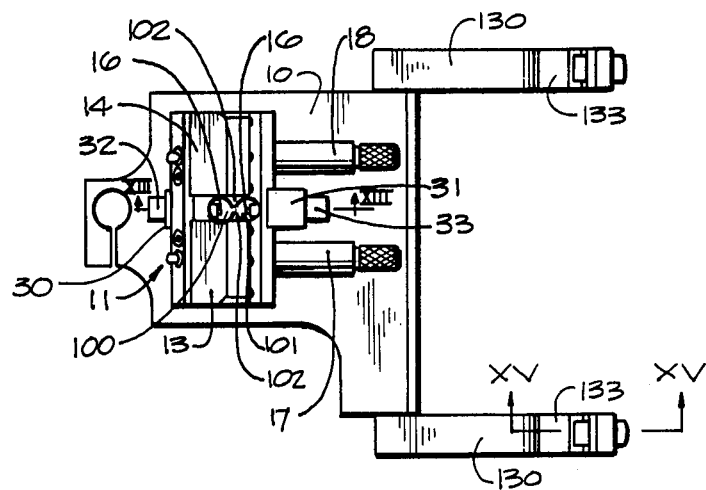
FIGS. 2 and 3 are a top plan view, and end view, respectively of the gripping head and support member therefore.
Figure 3:
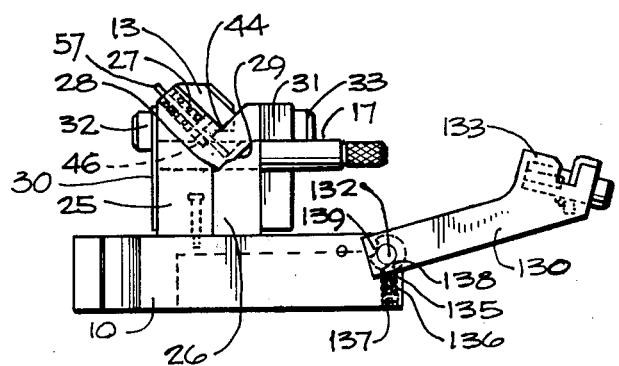

The form of the gripping head 11 is seen in more detail in FIGS. 2, 3 and 4. For convenience in manufacture, the head 11 has two main portions 25 and 26 attached together, the two portions being defined as the back portion 25 and the front portion 26. Back portion 25 has an inclined surface 27 which forms one surface of the Vee groove. The back portion also has a re-entrant formation 28 into which fits the front portion 26, the upper surface 29 of which being inclined and forming the other surface of the Vee groove.

Inset into the rear portion is a block of insulating material 30 and a similar block of insulating material 31 is attached to the front surface of the front portion 26. Extending through the blocks 30 and 31 are electrode holders 32 and 33, also of insulating material. Electrodes which are held by the holders 32 and 33 are positioned so as to be on the same level as the opposed fiber ends when held in the gripping head.

Slidably mounted on the inclined surface 27 are the two holding members 13 and 14. These are illustrated in more detail in FIGS. 5 to 8. Each holding member comprises a main body portion 35 having a rear flat surface 36 for sliding on surface 27 of the gripping head, and a front surface 37 parallel to the rear surface. Inset at one end, in the end nearest to the gap 15 when assembled to the gripping head, is a further sliding member 38. The further sliding member is held in place by the head of a screw 39 extending through a slot 40 into the holding member. A light compression spring 41 urges the further sliding member down. The lower end 42 of the holding member body portion 35 is flat but has two traingular ribs 43 extending therefrom. As will be described later, these ribs 43 extend into recesses in the surface 29 of the front portion 26. The flat end surface 42 abuts against the surface 29 when the holding members are in the downward, or holding, position. The angle between the end surface 43 and the rear surface 36 corresponds to the angle between the surfaces 27, 29 of the Vee groove 12. The holding members 13 and 14 only lightly hold the coated portions of the fibers and to assist in this the corner at the junction of the rear surface 36 and the lower end 43 is removed, as indicated at 44, seen also in FIG. 3, and more clearly in FIG. 11.

The holding members are spring loaded down into the Vee groove 12. Projecting from the rear surface 36 is a rib 45 having a groove 46 extending in from its outer end. This groove fits over an actuating pin, as will be described in conjunction with FIGS. 9 to 12, the rib acting as the lower abutment for a compression spring. The further sliding member 38, in each holding member, is arranged so that, in the position in which the holding member is slid up, the lower end of the further sliding member projects slightly below the end surface 42 of the holding member. The lower end of the further sliding member also has a triangular rib 47 extending therefrom, of the same form as ribs 43. Rib 47 also enters a recess in the surface 29 of the holding member. The arrangement is such that on downward movement of a holding member, the lower end of the further sliding member 38 will contact the uncoated portion of the fiber prior to the lower end of the main portion of the holding member engaging with the coated portion of the fiber.

Considering now FIGS. 9, 10, 11 and 12, FIG. 9 is a top plan view of the gripping head with the holding members 13 and 14 removed, and the inclined surface 27 of the rear portion 25 is seen. Also seen is the inclined surface 29 of the front portion 26. FIGS. 10, 11 and 12 are cross-sections, all on the same line of FIG. 9, but to a larger scale to illustrate the actuating mechanism for the holding members and how the holding members attach to the gripping head.

Extending down through the gripping head are two counterbored holes 55. These holes are provided for screws which hold the gripping head on to the support housing. Formed in the rear portion 25, downward from the surface 27, are two generally rectangular recesses 56. The recesses 56 extend in a direction normal to the surface 27. Extending across each recess and supported in holes in the rear portion 25 is a pin 57. Pin 57 has an enlarged lower end 58 sliding axially in a corresponding hole 59 and a smaller diameter upper end 60. A circular recess 61 in the lower surface of the member 14 fits over the enlarged lower end 58 and acts to retain the member 14 in position. The junction of the two portions 58 and 60 forms an abutment 62 which in the normal lowest position of the pin is approximately level with the lower side 63 of the recess 56. The upper side 64 of the recess 56 has a bore 65 and a light compression spring 66 surrounding the upper portion 60 of the pin 57 extending between a bush 69 in the bore 65 and the abutment 62. A washer 67 is provided between the lower end of the spring 66 and abutment 62, for insertion of the holding member.

Also illustrated in FIGS. 9 to 12 are recesses 70 in the surface 29 of the front portion 26, into which move the ribs 43 and 47. As seen in FIGS. 10, 11 and 12, the push rod 18 has formed therein a cam slot 71. The lower end of the pin 57 rests in the cam slot 71, which extends axially and has an upwardly inclined camming surface 72. The spring 66 urges the pin 57 downward into contact with the camming surface. Pushing of rod 18, that is to the left in FIG. 10, causes the pin 57 to lift, against the spring 66. FIG. 10 illustrates the arrangement with no holding member inserted, while in FIG. 11, holding member 14 is in position. Rib 45 extending from the rear surface of the holding member fits over the pin 57, the smaller diameter portion 60 positioned in the groove 46 in the rib 45. The washer 67 rests on top of the rib 45. Insertion, or attachment, of a holding member is simple. The related push rod is pushed part way in to lift the pin 57 and washer 67 a short distance from end surface 63 of the recess 56, this distance being slightly more than the thickness of the rib 45. By placing a finger on the upper end of the pin 57 to hold it in position, the washer 67 is lifted off of abutment 62 by inserting the outer end of the rib 45 under the edge of the washer and lifting upwards. As soon as the rib is clear of the abutment 62, the holding member can be pushed into position. A reverse procedure is used to remove a holding member; the rod pushed in slightly, finger placed on outer end of pin, the holding member slid slightly further up while the pin is retained stationary and the holding member lifted to clear the recess 61 from the lower end 58 and then pulled out. FIG. 12 illustrates the upward sliding of the holding member 14 when the push rod 18 is pushed in. Seen more clearly in FIG. 11 is the small gap or clearance formed by removal of the corner at the junction 44 between surface 36 and end 43 of the holding member. The two portions 25 and 26 forming the gripping head are fastened together by screws as indicated at 75 in FIG. 10.

FIG. 13, in conjunction with FIG. 2, illustrates the electrode system. Extending down into the gripping head from the inclined surfaces 27 and 29 are two bores 100 and 101. These bores are centered so as to have two opposed lands 102 extending towards each other at the bottom of the Vee groove to provide support for the fiber ends. The bores 100 and 101 extend downward far enough that the electrode holders 32 and 33 extend through into the bores, as seen in FIG. 13. A further bore or opening 103 extends up through the front portion 26 in alignment with bores 100 and 101 and with the central axis of the bore 103 coincident with the bottom of the Vee groove.

The gripping head 11, instead of being made of two portions, 25 and 26, can be machined from a single piece of material.

In each block 30 and 31, is a bore 110 in which fits a metal rod 111, for example of brass. The rod 111 can slide axially in the bore 110. A groove 112 is cut in the upper end of the rod 111, the two grooves, one in each rod 111, being aligned. In grooves are positioned the electrode holders 32 and 33. Each electrode holder has a hollow brass stem 113. In the axial bore through the stem 113 is positioned the electrode, a tungsten electrode, 115, held in position by a screw 116.

In the rod 111 is an axial bore 117 at the bottom of a size to accept an insulated high tension conductor. Extending axially from the bore 117 is a smaller diameter bore 118 which accepts the insulated conductor of the high tension conductor, the conductor being held in position by a screw 119. The rod 111 is positioned in the upper part of the bore 117 and is prevented from dropping down by a screw 120. A spring washer 121 is positioned between the top of the rod 111 and the upper end of the bore 110 to bias the rod down.

Also illustrated in FIGS. 1, 2 and 3 are swinging arms 130, and in FIG. 1 is also illustrated a heating member 131. In making a splice, a heat shrinkable sleeve is positioned over one of the fibers prior to fusing and then after fusing the arms 130 are swung over and grip the fibers. The arms are then swung back with the sleeve moved axially to cover the splice and then the splice positioned in the heating member 131. After heating to shrink the sleeve onto the splice, the spliced fiber is then removed from the arms 130.

The arms 130 are fixedly attached to a shaft 132 which passes through the support member 10 so that they swing in unison. Each arm has a gripping head 133, illustrated in more detail in FIGS. 15, 16 and 17. To position the arms in one of two positions, either at a gripping position in which a fiber is gripped in each gripping head or at a heating position where the heat shrink sleeve is heated, two detents are provided comprising two recesses in the shaft, spaced circumferentially, and a spring loaded ball is provided in the support member 10. The ball is indicated at 135, in FIG. 3, the spring at 136 with a screw 137 retaining the spring and ball. In FIG. 3 the ball is illustrated engated in one of the recess 138 in the shaft, holding the shaft so that the gripping heads are in the heating position. The other recess in the shaft is indicated at 139.

Figure 15:
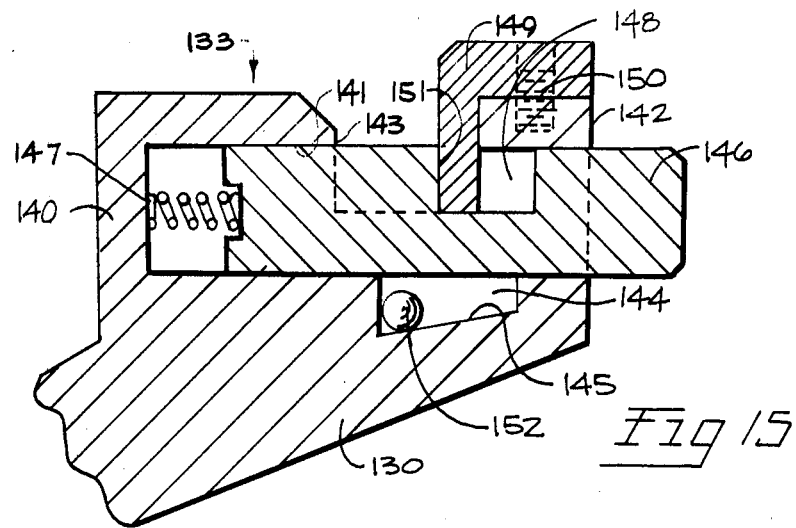
FIGS. 15, 16 and 17 are cross-sections through a gripping member on the line XV—XV of FIG. 2, the member illustrated in different orientations.

FIG. 15 illustrates, in cross-section, one of the gripping members 133 to a larger scale. In FIG. 15 the member is at an intermediate inclination, to illustrate the parts. The arm 130 is enlarged at its end 140. A bore 141 extends into the enlarged end 140 from the outer edge 142, the axis of the bore parallel to the longitudinal axis of the arm 130. The bore 141 extends almost to the inner edge of the enlarged end. A transverse groove 143 extends across the end 140 exposing the bore 141. A recess 144 is formed in the bottom of the bore 141 below the groove 143. This recess 144 is formed with an inclined lower surface 145, the surface inclined upward and outward relative to the axis of the bore 141. A button 146 is axially slidable in the bore 141. At its inner end there is provided a compression spring 147 which extends between the inner end of the button 146 and the inner end of the bore 141. The button extends out of the bore 141 and there is a transverse groove 148 at a position intermediate the ends of the button. A retaining member 149, attached to the end 140 by a screw 150 extends into the groove 148 through the groove 143. Normally the spring 147 urges the button 146 so that the inner end 151 of the groove 148 abuts the retaining member 149. A ball 152 rests in the recess 144 and the dimensions of the recess are such that at the lower end of the surface 145, as seen in FIG. 15, the ball is clear of the button 146, but the ball cannot travel completely to the other end of the surface 145.

Figure 16:
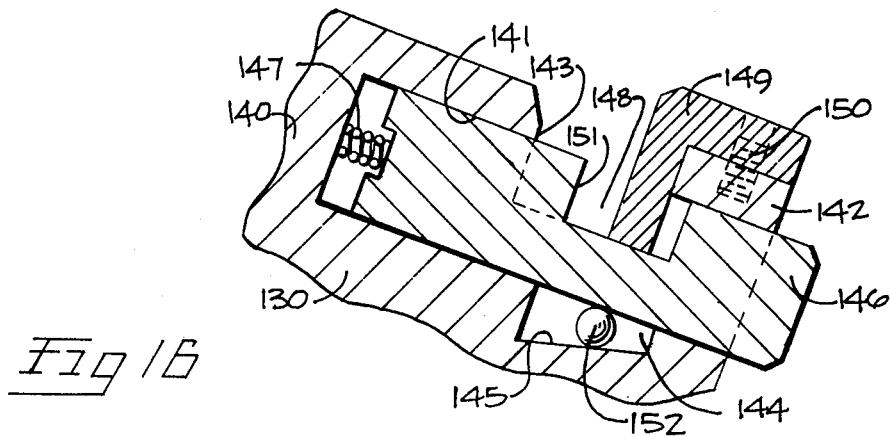

FIG. 16 illustrates one condition of a gripping member when the arms have been swung into the heating position. By pushing in the button 146 and then releasing it, the ball 152 rolls down the surface 145 and jams the button so that the button remains in an open condition, with a gap between the inner end 151 of the groove 148 and the retaining member 149. This gap is arranged to be larger than the overall diameter of an optical fiber which is spliced.

Figure 17:
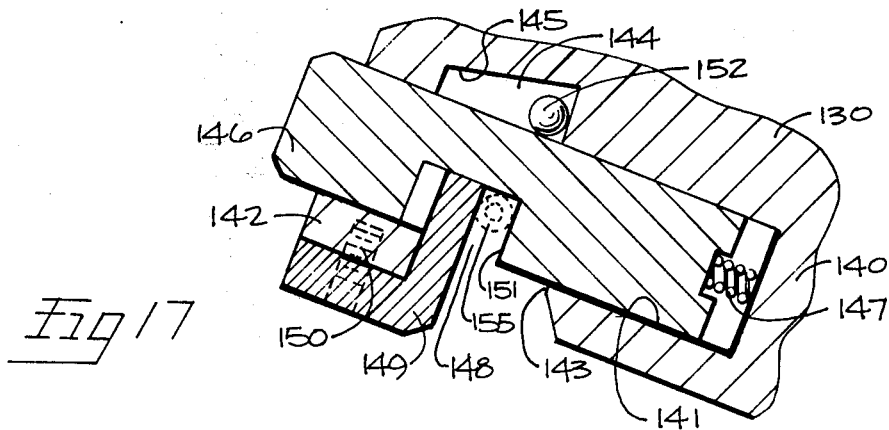

FIG. 17 illustrates an alternative condition of a gripping member, which occurs when the arms have been swung over to the gripping position. When the gripping members are in the gripping position it will be seen that the recesses 144 in which are housed the jamming balls 152 are inverted. If, in this position the button 146 is pushed and then released the ball 152 is released and runs down to the deeper end of the recess, releasing the button which is then biased outwards by the spring 147. In so doing the surface 151 of the transverse groove 148 will engage with a fiber held in the fusion head, the fiber being gripped between the surface 151 and the retaining member 149. This is illustrated in FIG. 17, an optical fiber being indicated in dotted outline at 155.

Figure 18:
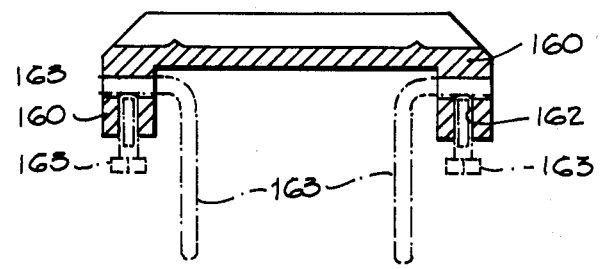
FIG. 18 is a bottom view of the heating member.
Figure 19:
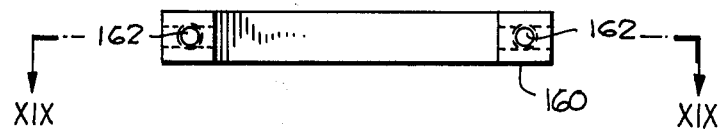
FIG. 19 is a cross-section on the line XIX—XIX of FIG. 18.
Figure 20:
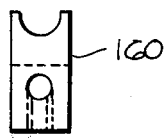
FIG. 20 is an end view of the heating member of FIG. 18.

From FIG. 1 it will be seen that the arms 130 are mounted on the support member 10 offset relative to the fusion head. Thus, as seen in FIG. 1, the left hand arm 130 is spaced laterally from the gripping head while the right hand arm 130 is positioned to just clear the gripping head. This provides room for positioning the heat shrinkable sleeve on the optical fiber at the left hand side of the gripping head. The support member 10 is mounted on the top surface of a housing 156. Mounted at the front of the housing 156 is the heating member 131. The heating member comprises a trough-like member 160, of electrically conducting material, as illustrated in FIGS. 18, 19 and 20. Electrical connection is made to the member 160 via leads 161 in holes 162 in the member 160 and screws 163. The leads 161 connect to an electrical circuit. As an example, the circuit of an electric soldering iron has been used, the heating element of the soldering iron being replaced by the member 160.

Operation of the apparatus is as follows. Two fibers to be spliced have their ends prepared, as by fracturing in the conventional manner and the plastic coating removed for a short distance. The holding members 13 and 14 are opened by pushing the rods 17 and 18. A sleeve of heat shrinkable material is positioned over one of the fibers, in the present example, the left fiber which is to hold in holding member 13. The sleeve is moved along the fiber to be clear of the holding member. The fibers are then in turn positioned in the holding members, the holding members being closed by pulling out of the rods 17 and 18. The ends of the fibers are abutted, the positioning being checked by the microscope 19. The two end faces are aligned with the points of the electrodes 115. At this time the arms 130 will be swung over to the front of the housing.

On the top surface of the housing 156 are provided various controls. Thus time control setting numbers 162, 163 and 164 are provided for setting heating time for heating member 131, prefusion time and fusion time. A power meter 165 is provided and also a control 166 for setting the arc power. An on-off AC supply switch 167 is provided, and at the lower or front part of the housing are two indicator lights 168 and 169 for indicating the end of the heated cycle and prefusion cycle. At the right hand side at the front are two pushbuttons 170 and 171 for prefusion and fusion respectively, while at the left hand side at the front is an enable pushbutton 172. Either one of buttons 170 and 171 and button 172 must be held down at the same time to operate the apparatus, thus ensuring both hands of the operator are not near the arc electrodes and also preventing accidental operation of the arc. A heater switch is provided at 173.

Once the fibers are correctly positioned in the holding members 13 and 14, two alternative processes can be carried out. Either the two fiber ends can be directly fused, or a prefusion step can be included. The prefusion step uses a lower power arc than in fusing and this rounds the ends of the fibers. It has been found that improved splices, with lower attenuation, can be formed with rounded fiber ends. The length of time for the arc is set by the controls 163 and 164. Assuming a prefusion step, buttons 170 and 172 are depressed and at the end of the preset time the arc will extinguish. Then buttons 171 and 172 are depressed. When the arc is again extinguished, after the preset time, the fusion can be inspected through the scope 19. It can be arranged that slight longitudinal movement is applied to one of the fibers during fusion to form the ends together.

After fusion, the fused fiber length is then moved to the heater. The gripping heads 133 are in the open position, that is with the buttons 147 pushed in and jammed open by the balls 152, as in FIG. 16. The arms 130 are swung over and the gripping heads positioned over the fibers, the arms being located in this position by the detent 139. The buttons 146 are released by first pressing in, which releases the balls 152 and then releasing the buttons to grip the fibers. The arms are then swung up and, prior to swing down to the heating position, the heat shrinkable sleeve moved laterally to extend over the splice. The arms are then fully lowered, to a position located by detent 135, with the sleeve close to the heating member 160. The heating member is then switched on by switch 173. After the preset heating time, indicator 168 is illuminated. There then follows a cooling period, the end of which is indicated by lamp 169. The fused fibers can then be removed by pressing in the buttons 146. Buttons 146 remain in the open position being jammed by the balls 152.

The electric circuitry inside the housing 156 is of conventional form and is mainly composed of circuits and components for producing an AC current for the arc from the AC input, means for controlling the current supply to the electrodes for forming the arc, and the various timing circuits for prefusion and fusion arc formations and for the heating member.

FIGS. 21 to 24 illustrate an alternative form of gripping head 180 in which, instead of sliding holding members as in FIGS. 2, 3 and 4, two pivotal fingers are provided, the fingers lifted or pivotted up for insertion of prepared fiber ends, and then lowered to hold the fibers. The fingers, which are spring loaded, have auxiliary spring loaded members having a very light spring loading which bear directly on the uncoated fiber ends.

Figure 21:
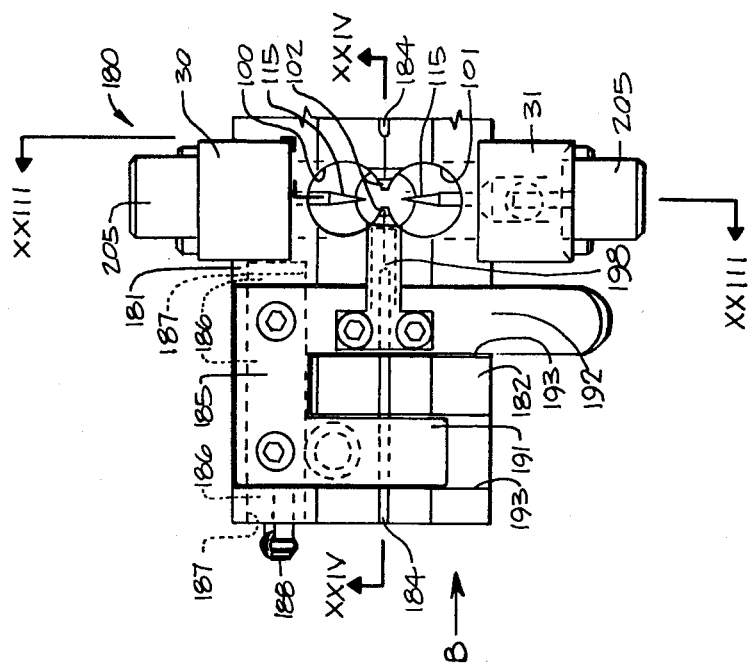
FIG. 21 is a top plan view of an alternative form of gripping head.
Figure 22:
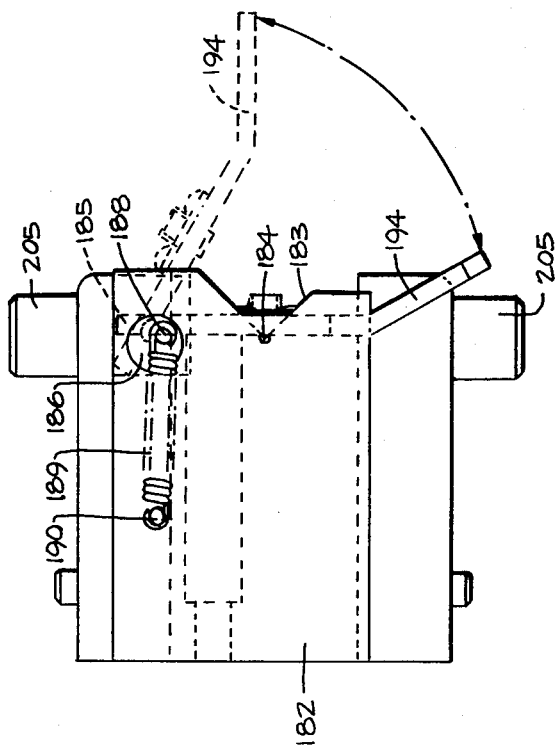
FIG. 22 is an end view in the direction of arrow B in FIG. 21.
Figure 24:
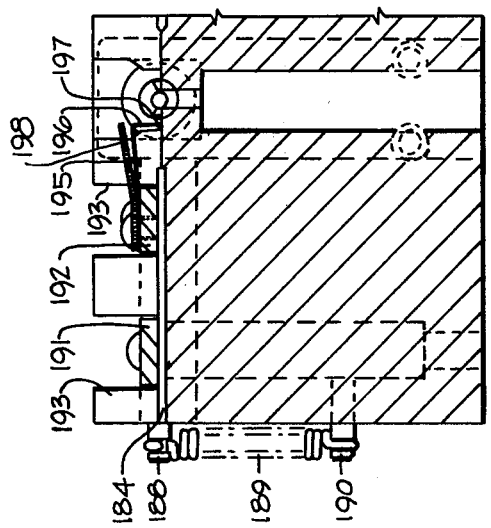
FIG. 24 is a cross-section on the line XXIV—XXIV of FIG. 21.
Figure 23:
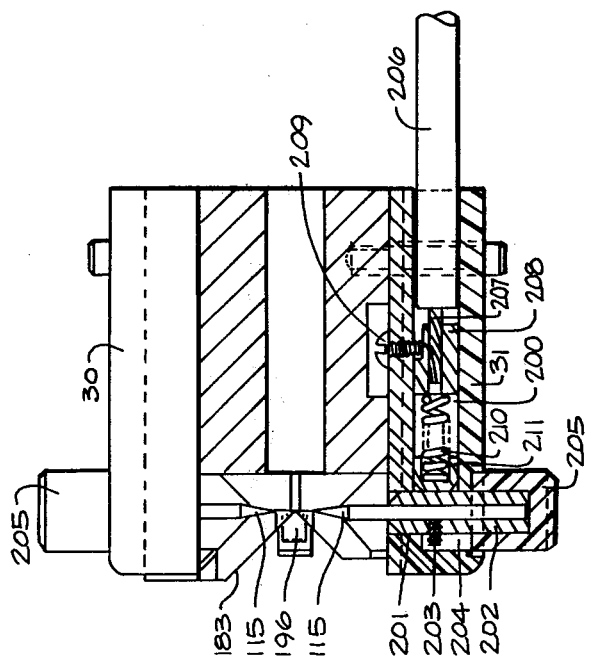
FIG. 23 is a cross-section on the line XXIII—XXIII of FIG. 21.

FIG. 21 is a plan view similar to that of FIG. 2. The central portion 181 of the gripping head 180 is of similar form to that of FIGS. 2, 3 and 4, with the same reference numerals applied to the same items. Thus the electrode mounting is the same but the method of connecting the electrical conductors to the electrodes varies, as will be described later. The same form of electrode connection as described above and illustrated in FIG. 13 can be used for the embodiment of FIGS. 21 to 24 and similarly the form of electrode connection as illustrated in FIGS. 23 and described below can be used for the embodiment of FIGS. 2, 3 and 4.

The gripping head 180 has a main body portion 182 with a Vee-shaped groove 183 formed in the upper surface. The base of the groove 183 is relieved, by a partially circular cross-section recesses 184. These recesses extend from the outer ends of the body portion 181 towards the centre the recesses stopping short of the lands 102 formed by the bores 100 and 101.

Pivotally mounted on the top of the body portion 180 towards the rear edge, on either side of the centre portion 181, are two finger members 185. Each finger member 185 is attached toward its rear edge to a shaft 186 which extends either side into bores 187 in the main body member. At the outer end of the shaft 186 a radially offset pin 188 projects in an axial direction and a tension spring 189 extends between pin 188 and a further pin 190 extending from the main body portion 180. The spring 189 biases the shaft 186 rotationally to cause the finger member to pivot down on to the top surface of the body portion 180. Each finger member is U-shaped as seen in plan form, as in FIG. 21, with two fingers 191 and 192. These fingers rest in grooves 193 extending across the body portion and one of the fingers, finger 192 in the example illustrated, is extended to provide a portion for engagement by the operator for lifting and lowering. This extended portion, 194, is also inclined slightly upwards.

Attached to finger 192 and extending laterally therefrom is a resilient cantilever 195. The outer end 196 of the cantilever 195 is bent downwards and rests in a narrow groove 197 cut in the Vee groove 183 at the land 102. The bent down portion 196 rests on the bottom surface of the groove 197 when no fiber is present. When a fiber is positioned in the Vee groove 183 the fingers 191 and 192 rest on the coated portion of a fiber and end portion 196 rests on the uncoated end portion of the fiber and holds it in position. The resiliency of the cantilever is such that it is readily flexed, and only a very light load is applied to the fiber. To protect the cantilever 195 a cover member 198 is positioned over the cantilever. The cover member 198 is bent upwards slightly to ensure that the cantilever can flex upwards when holding a fiber in position.

In use the finger member 185 on one side of the gripping head is lifted up and a prepared fiber positioned in the Vee groove 183. The coated portion of the fiber will rest in the recess 184 while the uncoated end will rest in the base of the Vee groove at the lands 102. Lowering of the finger member will locate the coated fiber in the recess 184 while the cantilever 195 will lightly hold the uncoated portion of the fiber. A further fiber is inserted in the other side of the gripping head by lifting up the other finger member and positioning the prepared fiber in the Vee groove 183. The correct endwise or axial positioning of the fiber ends is checked with the microscope 19 as with the alternative arrangement.

An arc is formed between the electrodes 115 as in the previously described embodiment. The process of producing a fused splice is the same as described above for the embodiment of FIGS. 2, 3 and 4 and FIGS. 5 to 20.

The electrode arrangement, as illustrated in FIG. 23, is an alternative arrangement to that illustrated in FIG. 13. Only one electrode support and connection arrangement is illustrated in FIG. 23, but is the same for both electrodes. In the block 31 is a bore 200 which extends up the block from the bottom almost to the top. A lateral bore 201 intercepts the bore 200, bore 201 going right through the block 31. In the bore 201 is positioned an electrode holder 202, in this example, of metal, for example brass. The electrode 115 is held in an axial bore in the holder 202 by a screw 203. Screw 203 slides in a slot 204 formed in the top of the transverse bore 201. A cap 205 is bonded or otherwise fastened to the electrode holder 202, the cap being of electrically insulating material. The electrical conductor is indicated at 206, with the bare metal conductor core at 207. The core is soldered to a ferrule 208 which slides axially in the bore 200. After insertion of the conductor, the ferrule is retained in the bore 200 by a screw 209. Between the top of the ferrule 208 and the electrode holder 202 is a compression spring 210. The upper end of the spring 210 fits into a metal cup 211 which bears against the electrode holder. The ferrule 208, spring 210 and cup 211 provide an electrical conductive path from the conductor to the electrode holder. The conductor is connected to the block 31 prior to attaching the block to the gripping head.

What is claimed is:

1. Apparatus for fusion splicing of optical fibers, comprising:
    a support housing;
    a fiber gripping head on said support housing the gripping head including two fiber holding members spaced apart laterally to hold two fibers in end-to-end axial alignment with the fiber ends in opposition at a predetermined position between the holding members, the gripping head including a Vee groove extending longitudinally in the direction of the axes of said fibers, said holding members spaced apart along the Vee groove, said Vee groove having two levels, a first level for reception of coated portions of fibers, and a second, higher, level for reception of uncoated end portions of fibers, said first level in two portions spaced on either side of said second level;
    each said fiber holding member comprising a finger pivotally mounted at a rear end on a rear part of the gripping head and extending forward over said Vee groove, each finger including a first part for locating a coated portion of a fiber in a first level of said Vee groove and a second part for locating and resiliently holding an uncoated end portion of a fiber in a second level of said Vee groove, said second part comprising a laterally extending spring member having an end portion extending towards the Vee groove, the second parts of the fingers extending towards each other and said end portions adjacent to and on either side of said predetermined position;
    means resiliently pivoting said fingers in a direction towards said Vee groove, and an extension on each finger for lifting the finger away from said Vee groove;
    two electrodes spaced in a direction normal to said Vee groove, an electrode on each side of said Vee groove at said predetermined position;
    means for supplying electrical power to said electrodes for formation of an arc therebetween for fusion splicing of opposed fiber ends;
    control means in said support housing for controlling the supply of electrical power to said electrodes; and
    means on said support housing for presetting said control means.

2. Apparatus as claimed in claim 1, said fiber gripping head mounted at a rear position on said support housing;
    a pair of interconnected pivotally mounted arms on said support housing, said arms mounted at an intermediate position on said housing and having outer ends pivotally movable from said rear position on the support housing, to a front position, said arms spaced one on each side of said gripping head; and
    fiber gripping means at each outer end for releasably gripping a fiber, the arrangement such that said arms can be swung over towards the rear position and a pair of fused fibers gripped by said fiber gripping means, the arms and said fibers then swung over to said front position, after lifting of said fingers away from said fibers.

3. Apparatus as claimed in claim 1, said control means including first means for forming a prefusion arc, whereby the ends of the fibers are rounded, and second means for forming a fusion arc for fusing opposed ends of fibers together.

4. Apparatus as claimed in claim 1, including a heating member mounted on said support housing at said front position, whereby a sleeve of heat-shrink material on said fibers can be heat shrunk over the fused splice.

* * * * *